United States Patent

[11] 3,629,671

[72] Inventors Naomasa Sunano; Shinichi Nishida, both of Kyoto, Japan
[21] Appl. No. 30,445
[22] Filed Apr. 21, 1970
[45] Patented Dec. 21, 1971
[73] Assignee Shinyei Co., Inc. Kobe, Japan
[32] Priority Apr. 23, 1969
[33] Japan
[31] 44/31763

[54] MEMORY AND NONMEMORY-TYPE SWITCHING ELEMENT
6 Claims, 34 Drawing Figs.

[52] U.S. Cl. .......... 317/238, 317/235
[51] Int. Cl. .......... H011 11/00
[50] Field of Search .......... 317/235, 237, 238, 231

[56] References Cited
UNITED STATES PATENTS

| | | | |
|---|---|---|---|
| 3,271,584 | 9/1966 | Ovshinsky | 317/235 X |
| 3,271,591 | 9/1966 | Ovshinsky | 317/235 |
| 3,327,137 | 6/1967 | Ovshinsky | 317/235 X |
| 3,418,619 | 12/1968 | Lighty | 338/20 |
| 3,440,588 | 4/1969 | Drake et al. | 338/20 |
| 3,543,196 | 11/1970 | Berglund | 333/70 |

*Primary Examiner*—James D. Kallam
*Attorney*—Wenderoth, Lind & Ponack

ABSTRACT: A semiconductor obtained by reducing a solid solution of vanadium oxide, barium oxide, and potassium oxide (or silver oxide) is disposed between electrodes, the amount of oxygen in $V_2O_5$ of the reduced solid solution being $V_2O_x$ in which $x$ is greater than 3.7 but less than 4.2. The element thus formed performs electrical switching action of memory or nonmemory type between high-resistance state and a low-resistance state. By selecting the amounts of the three constituent oxides in predetermined proportions which are variable depending upon the kind of metal serving as electrodes, a memory-type or nonmemory-type switching element can be obtained. Particularly in the case where an oxide film of a specific metal is provided between the electrodes along with the reduced semiconductor, the switching element may provide a high-resistance state, a first low-resistance state and a transitional second low-resistance state, so that when voltage is selectively applied between the electrodes, the element serves as memory and nonmemory type switching element.

NAOMASA SUNANO and
SHINICHI NISHIDA,
INVENTORs

BY Wenderoth, Lind & Ponack
ATTORNEYs

NAOMASA SUNANO and
SHINICHI NISHIDA,

INVENTORs

BY Wenderoth, Lind & Ponack

ATTORNEYs

NAOMASA SUNANO &
SHINICHI NISHIDA,
INVENTORS

BY Wenderoth, Lind & Ponack
ATTORNEYS

NAOMASA SUNANO and
SHINICHI NISHIDA,

INVENTORS

BY Wenderoth, Lind & Ponack

ATTORNEYS

NAOMASA SUNANO and
SHINICHI NISHIDA,

INVENTORS

BY Wenderoth, Lind & Ponack

ATTORNEYS

NAOMASA SUNANO and
SHINICHI NISHIDA,

INVENTORS

BY Wenderoth, Lind & Ponack

ATTORNEYS

NAOMASA SUNANO and
SHINICHI NISHIDA,

INVENTORS

BY Wenderoth, Lind & Ponack

ATTORNEYS

MEMORY AND NONMEMORY-TYPE SWITCHING ELEMENT

BACKGROUND OF THE INVENTION

1. Field of the Invention

The present invention relates to memory-type and non-memory-type solid switching elements to be used in control devices and memories in electrical apparatus.

2. Description of the Prior Art

Nonlinear semiconductor glass has already been proposed in Japanese Patent Publications No. 8393/68 and No. 30108/68 . The former discloses a glass which is made of an oxide of a single metal element, while the latter relates to a glass semiconductor element which comprises tellurium, thallium, arsenic, selemium, germanium, and silicon and which is capable of effecting switching action with or without memory. However, the characteristics of such element include a dielectric breakdown or thermal breakdown phenomenon and the element itself is subjected to deterioration, so that in addition to difficulties encountered during manufacture, troubles are also experienced in practical use. The present invention has eliminated these conventional drawbacks by carrying out selection of materials on experimental basis and provides switching elements which are free of deterioration, excellent in practical use and easy to produce without being subjected to troubles during manufacture.

SUMMARY OF THE INVENTION

In accordance with the present invention, the switching element incorporates a semiconductor obtained by reducing a solid solution of vanadium oxide, barium oxide, and potassium oxide (or potassium carbonate or silver oxide), the amount of oxygen in $V_2O_5$ being schiometrically $V_2O_x$ in which $x$ is greater than 3.7 but less than 4.2 . The element thus produced is a crystalline or amorphous oxide switching element capable of performing a memory or nonmemory switching action. By the term "crystalline oxide" as herein used is meant a glassy substance including some crystalline property and showing a definite peak form by X-ray analysis, while by the term "amorphous oxide" is meant a mere reduced glassy substance which does not show the above-mentioned peak shape.

DETAILED DESCRIPTION OF THE INVENTION

Figure 1:
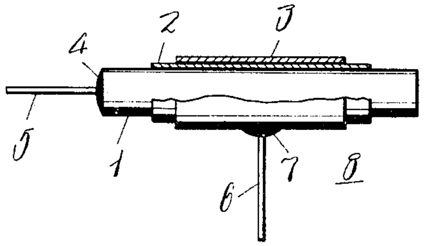
FIG. 1 is a side elevation with part broken away showing a switching element formed as a single element in accordance with the present invention.

Referring to the drawings, the present invention will be described in detail. As shown in FIG. 1 a base metal 1 selected from the group consisting of copper, iron, nickel, gold, platinum, titanium, silicon, tungsten, aluminum, chromium, nichrome molybdenum, tellurium, and carbon is provided, on its peripheral surface, with a semiconductor layer 2 comprising vanadium oxide $V_2O_5$, barium oxide BaO and potassium oxide $K_2O$ (or silver oxide, $Ag_2O$) in mol percent ratio of 95 –40 (95 –25 ): 5 –55 : 5 –50. Covering the semiconductor layer 2 is a cylindrical electrode 3 made of a member selected from the group consisting of silver, lead, copper, tin, platinum, iron, aluminum, and silicon. A lead wire 6 made of a metal wire or metal strip is secured to the electrode 3 by a solder 7. Another lead wire 5 is also secured to one end of the base metal 1 by a solder 4. In this manner, a switching element 8 employing a crystalline or amorphous oxide semiconductor is constructed. As will be described later with reference to FIG. 2, more than one lead wire may be provided to obtain a multiterminal element. The material of the lead wire 6 may be the same as or different from that of the electrode 3. The oxide switching element 8 thus formed may be covered with a suitable synthetic resin to ensure greater mechanical strength. In place of the oxide semiconductor layer 2, a reduced film layer comprising PbO, $SiO_2$, BaO, $K_2O$, and SrO may also be employed.

The switching action of the oxide switching element 8 takes place between the base metal 1 and the electrode 3. Selection of the threshold voltage depends upon the thickness of the oxide semiconductor layer 2 and the distance between the electrodes. The voltage-current characteristics of the switching element vary as illustrated in FIGS. 7, 8, 9, 14, and 15 depending upon production conditions. For instance, a switching element including a great barrier at the junction of base metal 1 and oxide semiconductor layer 2 has the characteristics shown in FIG. 7, while the characteristics such as shown in FIGS. 8 and 9 are attributable to the effect of the oxide semiconductor layer 2 itself. The smaller the thickness of the semiconductor layer 2, namely, the smaller the distance between the electrodes and the smaller the area of electrode 3, the more likely is it to obtain the characteristics as shown in FIG. 8 with a smaller tendency to show hysteresis as in FIGS. 9 and 10.

Figure 7:
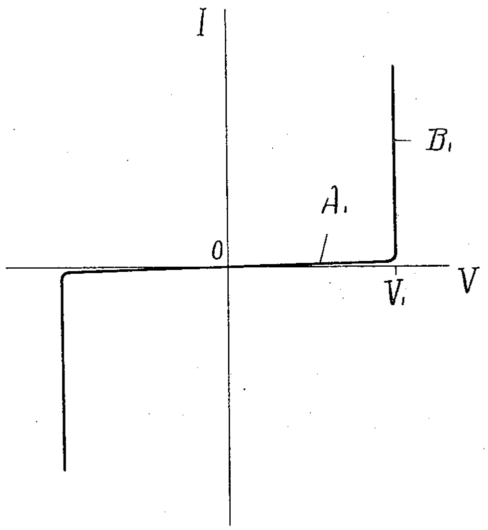
FIGS. 7, 8, 9, and 10 are diagrams showing typical voltage-current characteristics of several types of crystalline oxide switching elements in accordance with the present invention.
Figure 8:
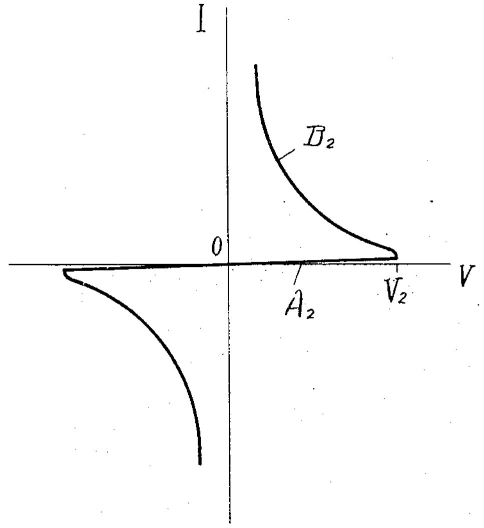
Figure 9:
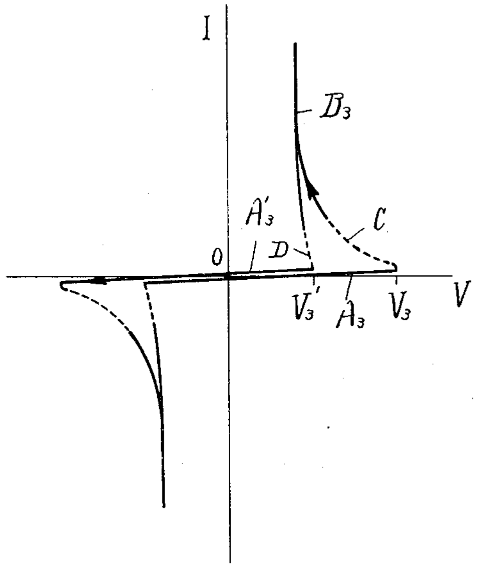
Figure 16:
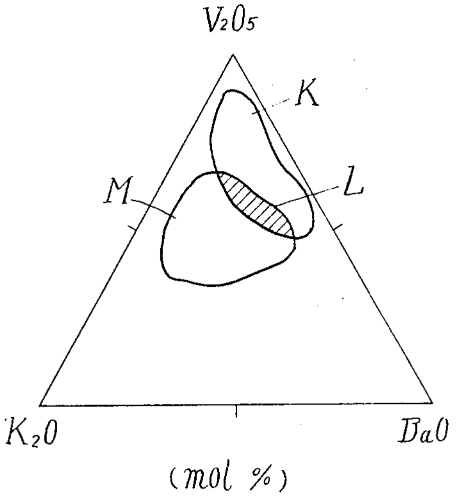
FIGS. 16, 17, and 18 are diagrams showing the proportion of three constituent materials of crystalline or amorphous oxides in accordance with the present invention, nichrome alloy being used as the base metal in FIG. 16, nickel being used in FIG. 17, titanium being used in FIG. 18.
Figure 17:
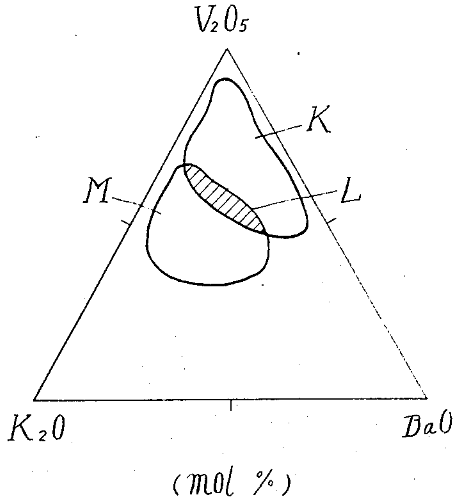
Figure 18:
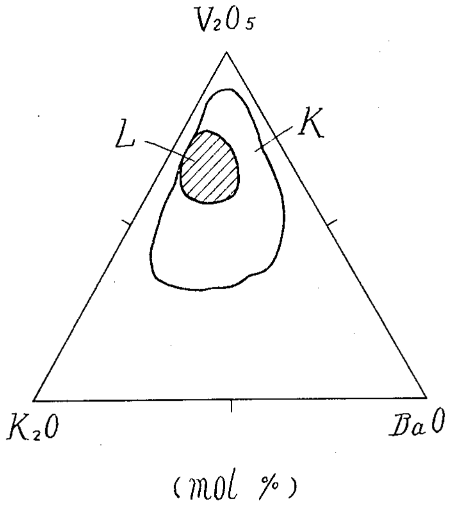

Switching elements having the characteristics shown in FIGS. 7, 8, and 9 are obtained when the semiconductor layer 2 is made of a solid solution comprising the three constituent oxides in proportions represented by part K part L in FIGS. 16, 17, and 18. (Nichrome is used as base metal in the case of FIG. 16; nickel, in FIG. 17; and titanium in FIG. 18). The solid solution comprising these constituents in such proportions has a relatively predominant crystalline structure. Presumably, the glassy phase includes fine crystals of $VO_2$ dispersed therein.

On the other hand, in the case where the semiconductor layer 2 is made of a solid solution in constituent proportions of part L and part M shown in FIGS. 16, 17, and 18, memory-type switching elements having characteristics shown in FIGS. 14 and 15 are obtained. The solid solution having such composition is considered to be predominantly amorphous and vitrified, including no fine crystals of $VO_2$.

Similar switching elements of memory type can also be obtained by employing a thin layer comprising PbO, $SiO_2$, BaO, $K_2O$, and SrO in place of the amorphous layer 2.

FIG. 15 shows the voltage-current characteristics of switching elements which are produced by the barrier present at the junction of metal and oxide semiconductor layer 2 and which are also attributable to the effect of the oxide semiconductor layer 2.

Use of silicon as the base results in voltage-current characteristics which are symmetric with respect to the origin.

The type of the oxide switching element, which is thus versatile, is determined as desired depending upon production conditions such as kind of base metal, proportions of components of the oxide semiconductor layer 2, thickness of oxide semiconductor layer 2, size of electrodes, distance between the electrodes, temperature at which the oxide semiconductor layer 2 is formed, cooling velocity and gaseous atmosphere.

Figure 2:
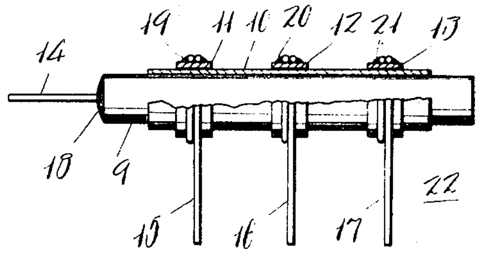
FIG. 2 is a side elevation with part broken away showing an embodiment of the present invention which comprises plural switching elements.

FIG. 2 illustrates a multiterminal element obtained by modifying the element shown in FIG. 1. A base metal 9 selected from the group consisting of copper, iron, nickel, platinum, gold, titanium, tungsten, aluminum, chromium, silicon, tellurium, and nichrome is externally coated with a crystalline or amorphous oxide semiconductor layer 10 comprising vanadium oxide $V_2O_5$, barium oxide BaO and potassium oxide $K_2O$ (or silver oxide, $Ag_2O$) in mol percent ratio of 95 –40 l (95 –25): 5 –50 : 5 –50. Provided on the semiconductor layer 10 are electrodes 11, 12 and 13 made of silver paint, silver, lead, tin, aluminum or the like. Lead wires 14, 15, 16, and 17 are each fixed to one end of the base metal 9 and peripheral wall portions of the electrodes 11, 12, 13 by solders 18, 19, 20, 21 to obtain a switching element 22.

Instead of providing the semiconductor layer 10, a glass film made of PbO, BaO, $K_2O$, SrO, and $SiO_2$ can be used in forming the switching element 22.

In this embodiment, switching action takes place between the base metal 9 and the electrodes 11, 12, 13, and between the base metal 9 and the crystalline or amorphous oxide layer or the barrier of base metal oxide layer. FIGS. 7, 8, 9, 10, 14, and 15 illustrate the voltage-current characteristics to be obtained in this case depending upon the production conditions.

Figure 3:
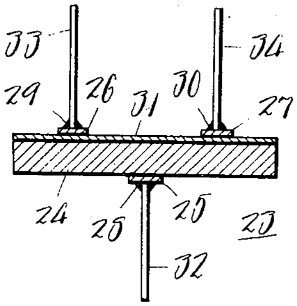
FIG. 3 is a view in section showing switching elements in accordance with the present invention obtained by forming a semiconductor layer on a metal plate.

A switching element 23 shown in FIG. 3 has a flat platelike base metal 24 which corresponds to the base metal 9 in the switching element 22 in FIG. 2. The voltage-current characteristics of this embodiment are exactly the same as the switching element shown in FIG. 2. Designated at 25, 26, 27 are electrode members; at 28, 29, 30, solders; at 31, oxide semiconductor layer; and at 32, 33, 34, lead wires.

Figure 4:
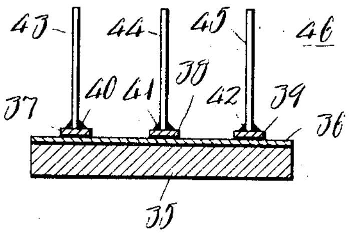
FIG. 4 is a view in section showing switching elements in accordance with the present invention obtained by forming a semiconductor layer on an insulating plate.
Figure 10:
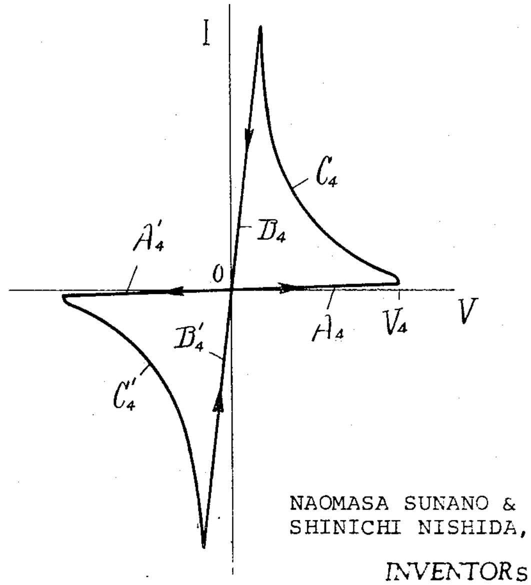

A switching element 46 shown in FIG. 4 comprises a baseplate 35 made of an insulating material such as glass, alumina ceramic or the like, crystalline or amorphous oxide semiconductor layer 36 covering one face of the base plate 35, electrodes 37, 38, 39... fixed to the upper face of the semiconductor layer 36, and lead wires 43, 44, 45... secured to the electrodes by solders 40, 41, 42.... As with the foregoing embodiments, versatile voltage-current characteristics as shown in FIGS. 8 to 10 are obtained depending upon production conditions.

FIG. 5 shows an example of the method for producing the crystalline or amorphous switching element already described, particularly for forming the crystalline or amorphous oxide layer illustrated in FIG. 2. The views *a*, *b*, *c*, *d*, *e*, and *f* are presented in the sequential order of production procedure. A nickel wire serving as base metal 47 is heated to 300 ° to 800 ° C. A composition comprising $V_2O_5$, BaO, and $K_2O$ (or $Ag_2O$) in mol percentage ratio of 95 –40 (95 –20): 5 –50 : 5 –50 is placed in a pot 51 and heated by a gas flame 48 or electrical heater 50 connected to a power source 49. The heated nickel wire 47 is placed into the molten composition 52 thus prepared, whereby the nickel wire 47 is coated with homogeneous crystalline or amorphous semiconductor layer 53 which is free of pinholes as shown in FIG. 5*d*. The article obtained is then fired at 800 ° to 1200 ° C. for 1 to 5 minutes in a reducing gas flame such as a propane gas flame and thereafter rapidly cooled in the air for 0.5 to 3 seconds to a temperature of not higher than 200 ° C. so that the amount of oxygen in $V_2O_5$ may be $V_2O_x$ in which $x$ is greater than 3.7 but less than 4.2 . A desired number of annular electrodes 54, 55, 56... made of a conducting material such as metal or carbon are then attached to the semiconductor layer 53. By solders or pressed metal 57, 58, 59, 60..., lead wires 61, 62, 63, 64... are fixed. FIG. 5*f* shows a switching element 65 produced in this manner.

Figure 5A:
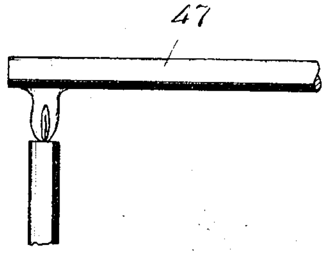
FIGS. 5*a*, *b*, *c*, *d*, *e*, and *f* are views showing the steps of producing an oxide switching element in accordance with the present invention, the views being in sequential order of production steps, the view 5*b'* showing another mode of the production method.
Figure 5C:
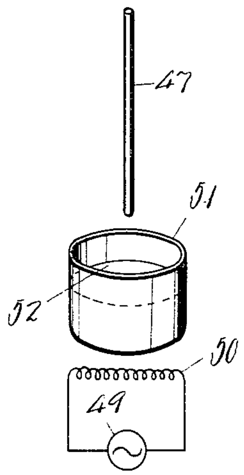
Figure 5B:
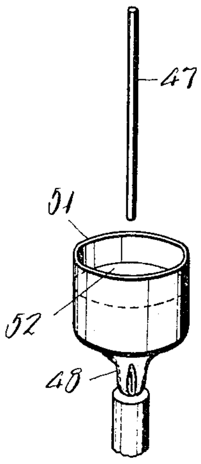
Figure 5C:
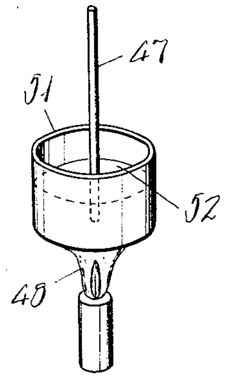
Figure 5D:
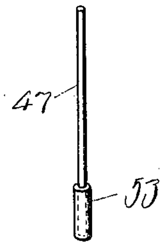
Figure 5E:
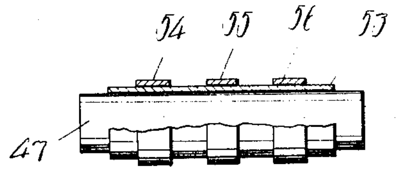
Figure 6A:
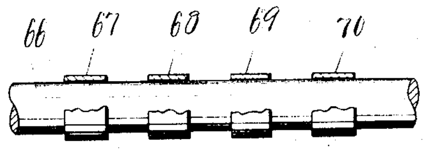
FIGS. 6*a*, *b*, and *c* are views showing another method of the present invention for coating a metal base with semiconductor layers, the views being in sequential order of the production procedure.
Figure 5F:
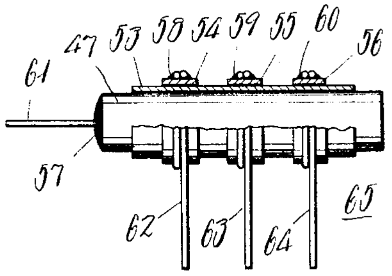
Figure 6C:
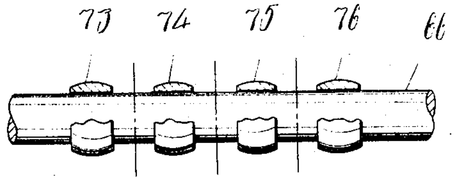
Figure 6B:
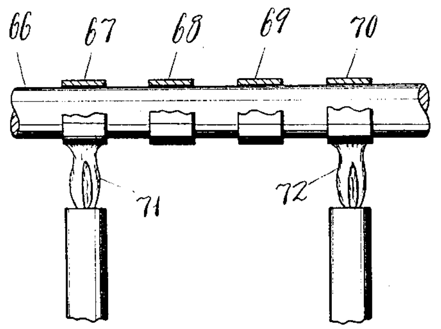

In the process described, the steps shown in FIGS. 5*a*, *b*, *c* may be readily carried out in the manner illustrated in FIG. 6. In accordance with this method, a mixture of oxides in the same proportions as in the above-described process is heated to at least 900 ° C. and the hot molten mixture is immediately subjected to rapid cooling. The resultant solid is further comminuted to prepare a powder of crystalline or amorphous reduced oxide semiconductor which is then made into a paint-like composition using an organic binder. The resultant composition is applied by coating (or by printing) to the surface of the base metal 66 locally or over the entire area thereof to a thickness of 0.5 to 5 $\mu$. The paint layers 67, 68, 69, 70..., after being dried, are fired by a gas flame 71, 72 or the like at 800 ° to 1,200 ° C. for 1 to 5 minutes and rapidly cooled in the air for 0.5 to 3 seconds to a temperature of not more than 200 ° C. As a result, crystalline or amorphous homogeneous oxide semiconductor layers 73, 74, 75, 76... are formed. The product may be separated by cutting off as along the dotted line shown in FIG. 5*c* to obtain individual elements, each provided with a semiconductor layer. The semiconductor element, when it is not cut off, serves as a multiterminal element. The electrodes and lead wires may be fixed in the same manner as in the embodiment in FIG. 5. In the case where the solid solution is subjected to rapid cooling, a more amorphous structure can be obtained.

Crystalline or amorphous oxide switching elements are produced in the manner described above. In the aforementioned procedure, a thin oxide film layer is formed on the surface of nichrome wire base metal by preheating or other method. Where the effect of this layer is prominent, the resultant element performs memory type switching action. If a film of titanium oxide $TiO_2$ is formed by preheating or some other method in an embodiment employing titanium as base metal, a nonmemory type, nonlinear switching element may be obtained as shown in FIG. 7, whereas in the case where the base metal surface is not covered with an oxide film and a thin oxide semiconductor layer which is predominantly crystalline and comprises constituents in the proportions represented by part K and part L in FIGS. 16 to 18 is formed, a results shown in FIG. 8 will be achieved. On the contrary, a thick semiconductor layer results in characteristics as given in FIG. 10 or 9, whereas a thin layer predominantly very amorphous and comprising components in the proportions of part L and part M in FIGS. 16 to 18 produces nonmemory type switching characteristics shown in FIGS. 14 to 15.

Further the characteristics in FIG. 9 are achieved by an element comprising an insulating plate serving as a base and a relatively highly crystalline semiconductor layer disposed between the electrodes in FIG. 4 which are spaced apart by 0.1 mm. In an instance where a similar base is employed and a relatively highly crystalline semiconductor layer is formed between the electrodes as shown in FIG. 4 which are spaced apart by 0.5 mm., the element obtained has characteristics as seen in FIG. 10. The thickness of semiconductor layer can be determined as desired depending upon the melting temperature of the solid solution or the preheating temperature of the base metal, the type of base metal and the like.

The elements 22 and 23 and the element 46 comprising a ceramic plate serving as a base are produced exactly in the same manner.

FIG. 7 shows voltage-current (V-I) characteristics observed when a sine wave voltage of a frequency of 60 c.p.s. is applied across any two terminals of the elements described above. It will be seen that until voltage reaches a threshold voltage $|V_1|$ a high resistance value $A_1$ is maintained, while beyond the threshold voltage $|V_1|$ the resistance drops abruptly to a low value of $B_1$. The diagram passes through the origin and is symmetrical over the negative voltage range, this being typical of a nonlinear element. The threshold voltage $V_1$ ranges from several volts to several tens of volts, the allowable current being in the order of several hundreds of milliamperes.

FIG. 8 shows voltage-current (V-I) characteristics of an element observed when a sine wave voltage of a frequency of 60 c.p.s. is applied to the opposite terminals. It will be noted that until voltage reaches a threshold voltage $V_2$, a high resistance value $A_2$ is maintained, while in the region beyond the threshold voltage $V_2$ the element has a continuous negative resistance value of $B_2$. The diagram of the characteristics passes through the origin and is symmetrical over the negative voltage range. The allowable current is in the order of several tens of milliamperes.

The voltage-current (V-I) characteristics shown in FIG. 9 are obtained by applying a sine wave voltage of a frequency of 60 c.p.s. to two terminals of an element having threshold voltages at two higher and lower levels. It is seen that before the voltage reaches a higher threshold voltage $Va$, a high resistant state $A_3$ is maintained, whereas upon exceeding the threshold voltage $|Va|$ the element is switched into a low resistance state $B_3$ at a velocity of nanosecond by way of a discontinuous portion C. On the other hand, when the voltage is lowered, a low resistance state $B_3$ is maintained above a lower threshold voltage $|Vb|$ and upon the lowering voltage passing the level of the threshold voltage $|Vb|$, the element is switched into a high resistance state $A'_3$ at a velocity of millisecond by way of a discontinuous portion D. The diagram represents symmetrical hysteresis over the negative voltage range with respect to the origin.

The voltage-current (V-I) characteristics shown in FIG. 10 are obtained by applying a sine wave voltage of a frequency of 60 c.p.s. across two terminals of an element. Until the voltage reaches a threshold voltage $|V_4|$, a high-resistant state $A_4$ is maintained and upon exceeding the voltage $|V_4|$, the element is switched into a low-resistance state $B_4$ toward the origin by way of a continuous or discontinuous state $C_4$. The moment a negative voltage is applied upon passing the origin as the voltage is lowered below the threshold voltage $V_4$, transition to a high-resistance state $A'_4$ is effected, the element thus showing hysteresis which is symmetrical with respect to the origin. Moreover, transition from $B_4$ to $A'_4$ or from $B'_4$ to $A_4$ is not necessarily effected by way of the origin but this depends on the lowering rate of the applied voltage.

Figure 11:
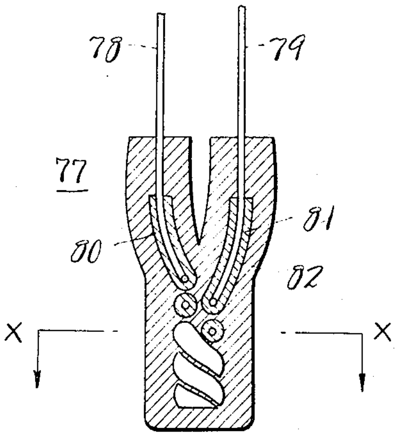
FIG. 11 is a view in section showing a crystalline or amorphous oxide switching element in accordance with the present invention.
Figure 12:
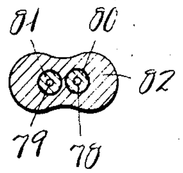
FIG. 12 is a view in section taken along the line X —X in FIG. 11.
Figure 14A:
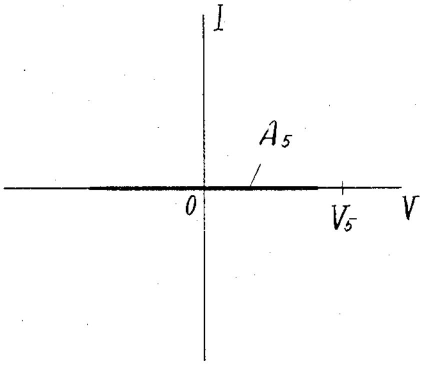
FIGS. 14*a*, *b*, *c*, and *d* are diagrams showing voltage-current characteristics of the memory type, amorphous oxide switching elements of the present invention shown in FIGS. 1, 2, 3 and 11.

FIG. 11 shows a memory-type switching element 77 provided with a pair of base metal wires 78 and 79 of copper serving also as lead wires or connected to lead wires. Crystalline copper oxide layers 80 and 81 formed over a predetermined area of the surface of the base metal wires 78 and 79 are coated with an oxide glass semiconductor layer 82 comprising vanadium oxide $V_2O_5$, barium oxide BaO and potassium oxide $K_2O$ in the proportions represented by part L and part M in FIGS. 16, 17, 18. Alternatively the semiconductor layer 82 may be a thin glass layer composed of PbO, $K_2$, O, BaO, $SiO_2$, and SrO. The element 77 thus formed is a crystalline or amorphous oxide switching element. The material of the base metal wire 78, 79 is not limited to copper, but nickel wire, nichrome wire, iron wire or the like may also be used. Provision of a layer made of oxide of the base metal over the base metal surface along with amorphous oxide glass layer in the above-mentioned constituent proportions also results in an element as desired. FIG. 15 shows the characteristics of the switching element thus obtained which are accompanied by memory. Instead of providing an oxide layer over the base metal but by forming a glass layer of the foregoing composition over the clean base metal surface, a switching element is produced which has the characteristics of a memory type as presented in FIG. 14.

Figure 13:
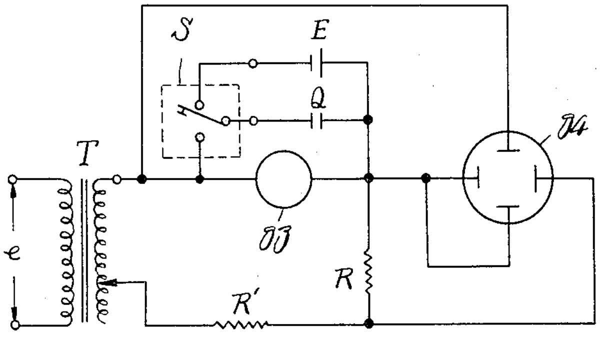
FIG. 13 is an electric circuit diagram for measuring voltage-current characteristics of an oxide switching element in accordance with the present invention.
Figure 14B:
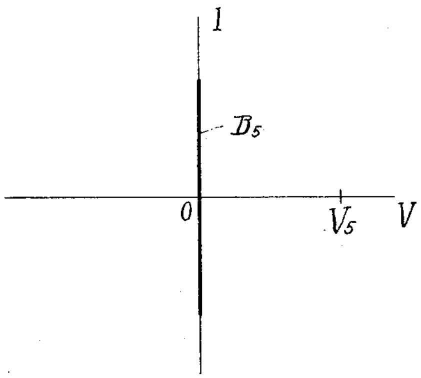
Figure 14C:
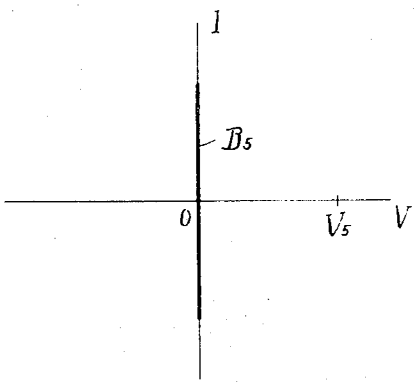
Figure 14D:
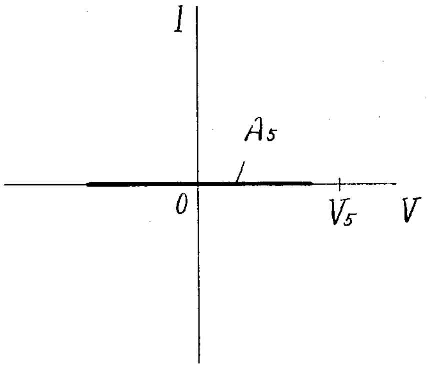
Figure 15A:
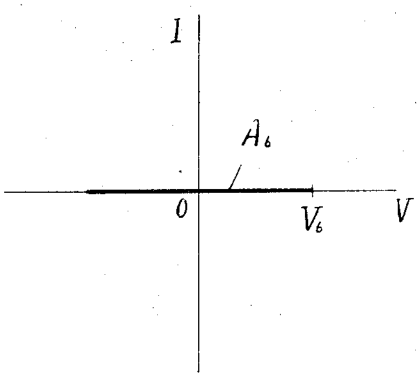
FIGS. 15*a*, *b*, *c*, *d*, *e*, and *f* are diagrams showing voltage-current characteristics of memory or nonmemory type, amorphous switching elements of the present invention having a barrier effect produced by the oxide of the metal base.
Figure 15B:
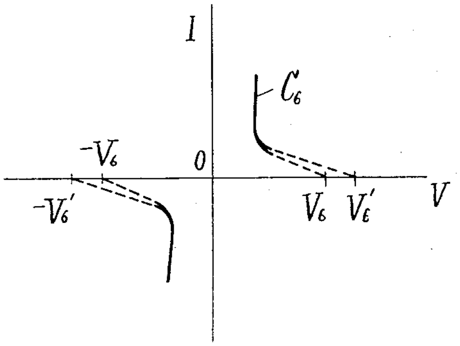
Figure 15C:
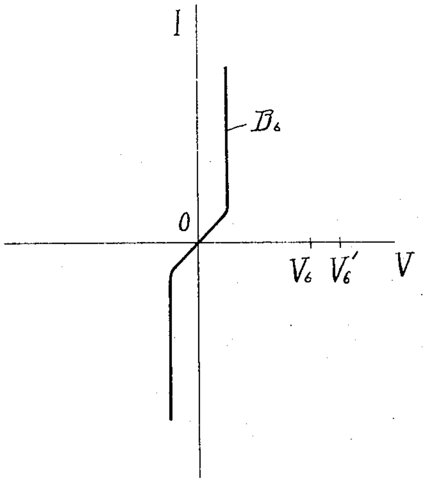
Figure 15D:
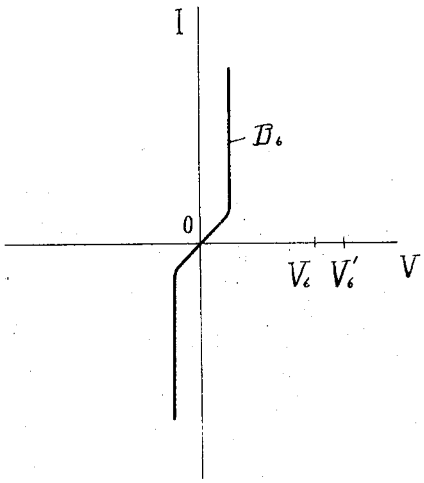
Figure 15E:
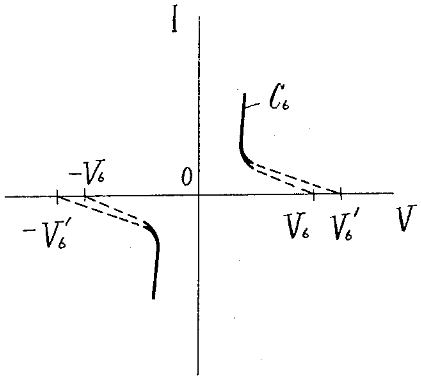
Figure 15F:
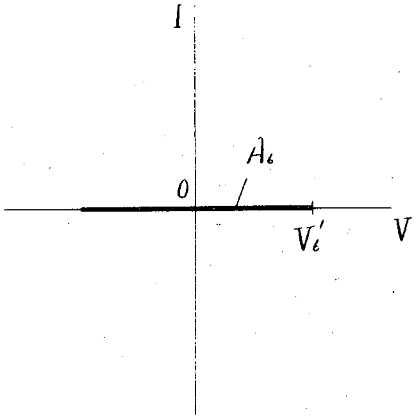

Measurement of such switching action of the memory type can be made by the circuit illustrated in FIG. 13, in which designated at 83 is a memory-type switching element; at 84, a cathode-ray oscilloscope; at T, a transformer; at R and R', resistors; at E, a battery; at Q, a capacitor and at S, a switch. These members are connected together as shown in FIG. 13. A power source $e$ of a sine wave voltage of 60 c.p.s. is connected to the primary winding of transformer T. As the secondary voltage is elevated gradually from zero, the switching element 83, if it is initially in the nonconduction state, maintains a high-resistance state $A_5$ shown in FIG. 14(a) over the entire range below a threshold voltage $|V_5|$ in FIG. 14$a$. When the voltage across the terminals of the switching element 83 exceeds the threshold voltage $V_5$, transition to a low-resistance state $B_5$ shown in FIG. 14$b$ is effected to bring the circuit into the conduction state. Although the voltage applied to the element 83 may subsequently be stepped up or lowered below the threshold voltage to zero level, or the voltage may be in the negative range below $|Vs|$, the conduction state $B_5$ is memorized and retained as shown in FIG. 14$c$.

However, by turning the movable contact of the turnover switch S from the terminal of the buttery E into contact with the terminal of the element 83 to instantaneously apply the charging voltage of the capacitor Q across the element 83, namely to apply a pulsating voltage to the element 83 when the applied voltage is below the threshold voltage $|V_5|$, the element 83 is brought to the initial high-resistance state $A_5$ for transition from the conduction state to the nonconduction state. The value of the pulsating voltage required for the transition is approximately 1 percent of the threshold voltage $V_5$. The respective states of memory can be effected repeatedly and continuously in reversible manner. The marked variation in electrical conductivity of the switching element achieved by a very low pulsating voltage ensures control of a high power of several hundreds of watts and application to electrical memory circuits.

The memory-type switching element 83 thus constructed can be so adapted as to perform combined nonmemory and memory type switching action as shown in respective diagrams in FIG. 15 by varying production conditions. It will be seen that the element shows a high resistance state $A_6$ in FIG. 15$a$, while in the voltage range from a low threshold voltage $|V_6|$ to a high threshold voltage $|V_6|$ nonlinear action $C_6$ is effected as shown in FIG. 15$b$. At the voltage beyond this range the element is switched into a conduction state $B_6$ as seen in FIG. 15$C$, which is retained without any variation as apparent in FIG. 15$d$ even if the voltage is raised, lowered or decreased to zero level.

In such conduction state $B_6$, when the voltage across the terminals of the element is below threshold voltage $V_6$, a pulsating voltage is applied to the element through the switch S in the same manner as in the foregoing, whereby transition to the state shown in FIG. 15$e$ or $f$ can be achieved depending upon the level of the voltage across the terminals.

Thus, the semiconductor element having the characteristics shown in FIG. 15 is capable of performing switching action accompanied by memory, switching action without memory and switching action of a combined type of these two modes of operation, the limitation showing special conditions having threshold voltages at higher threshold value $|V'_6|$ and lower threshold value $|V_6|$.

In the switching elements described, very small terminals may be provided on one base in piled form. The present switching element is an ideal invention which can be used as a switching or memory element for computers, a switching element for surface indication devices, high-power control apparatus, or discharge tubes in place of a diode.

Experiments were carried out for trial production of switching elements and based upon the results of numerous experiments it has been made possible to manufacture the elements described above. Working of the present invention is ensured insofar as it is carried out substantially within the scope of the invention described.

What we claim is:

1. A switching element for memory and nonmemory operation comprising a first electrode and a second electrode both of an electrically conductive metal and a semiconductor disposed between said electrodes, said semiconductor being the reduced material of a solid solution of a mixture of vanadium oxide, barium oxide, and potassium oxide in mol percent ratio of 95–40: 5–50: 5–50, the amount of oxygen in the vanadium oxide of the reduced material being $V_2O_x$ in which $x$ is greater than 3.7 but less than 4.2, said material having means for producing a high-resistance state within a range of threshold voltages applied in either direction wherein the absolute value of voltage applied across said electrodes increases, and said material having means for producing a low-resistance state at a voltage beyond said threshold voltages, the transition between these states being reversible.

2. The switching element as claimed in claim 1 wherein said semiconductor comprises the reduced material of a solid solution of a mixture of vanadium oxide, barium oxide, and silver oxide in mol percent ratio of 95–25: 5–50: 5–50, the amount of oxygen in the vanadium oxide $V_2O_5$ of the reduced solid solution being $V_2O_x$ in which $x$ is greater than 3.7 but less than 4.2.

3. The switching element for nonmemory operation as claimed in claim 1 wherein said first electrode is a bar of a metal selected from the group consisting of platinum, gold, titanium and nichrome, a layer of said semiconductor being provided on the surface of said first electrode, at least one second electrode of electrically conductive metal being provided on said semiconductor layer, said first and second electrodes being provided with lead wires respectively, said transition between these states being reversible upon increase or decrease of the applied voltage.

4. The switching element for nonmemory operation as claimed in claim 1 wherein said first and second electrodes are made of electrically conductive metal pieces, at least two of said electrodes being fixedly provided on a layer of said semiconductor formed on a ceramic insulating plate, each of said electrodes being provided with a lead wire, said transition between these states being reversible upon increase or decrease of the applied voltage.

5. A switching element for memory operation comprising a nichrome metal bar serving as a first electrode, at least one electrically conductive metal piece serving as a second electrode and disposed around said first electrode with a sheathlike space interposed therebetween, and a semiconductor disposed between said first and second electrodes, said semiconductor comprising an oxide film of said nichrome electrode metal and the reduced material of a solid solution of a mixture of vanadium oxide, barium oxide, and potassium oxide in mol percent ratio of 95–40: 5–50: 5–50, the amount of oxygen in the vandium oxide of the reduced material being $V_2O_x$ in which $x$ is greater than 3.7 but less than 4.2, said material having means for producing a high-resistance state over a range defined by a lower threshold voltage applied in the direction in which the absolute value of positive or negative voltage applied across said electrodes increases, said material having means for producing a first low-resistance state at a voltage over a range from said lower threshold voltage to a higher threshold voltage, and said material having means for producing a bound second low-resistance state abruptly effected at voltages beyond said higher threshold voltage, the transition from said second low-resistance state to said first low-resistance state or to said high-resistance state being selectively effected in accordance with the state of voltage applied across main electrodes when a pulsating voltage is applied across gate electrode lead terminals provided separately from main electrode lead terminals for said first and second electrodes.

6. The switching element for memory operation as claimed in claim 5 wherein said semiconductor comprises an oxide film of said nichrome electrode metal and the reduced material of a solid solution of a mixture of vanadium oxide, barium oxide and silver oxide in mol percent ratio of 95–25: 5–50: 5–50, the amount of oxygen in the vanadium oxide $V_2O_5$ of the reduced solid solution being $V_2O_x$ in which $x$ is greater than 3.7 but less than 4.2.

* * * * *